Jan. 31, 1967     J. A. CHERNAK ETAL     3,301,525

FLANGED SEAT CUP VALVE MEMBER WITH RETENTION MEANS

Filed July 1, 1964

INVENTORS.
JOHN A. CHERNAK &
GILBERT T. DELLY
BY Fay & Fay
ATTORNEYS

United States Patent Office 3,301,525
Patented Jan. 31, 1967

3,301,525
FLANGED SEAT CUP VALVE MEMBER WITH RETENTION MEANS
John A. Chernak, Lyndhurst, and Gilbert T. Delly, Maple Heights, Ohio, assignors to Tomlinson Industries, Inc., Cleveland, Ohio, a corporation of Ohio
Filed July 1, 1964, Ser. No. 379,552
5 Claims. (Cl. 251—331)

This invention relates to a valve of the type utilizing a resilient seat cup and more specifically is directed to a valve construction embodying a novel sealing arrangement for preventing leakage of fluid in the event of seat cup rupture.

The particular valve here involved and the novel sealing arrangement which forms a part of the valve assembly are adapted for use in beverage dispensers such as those found in private homes and public places. Seat cups adapted for use in valves of the general construction herein disclosed are commercially available in various sizes and designs. A particular type of seat cup which has been particularly successful includes the provision of a flexible nipple portion having a substantially radial transverse shoulder or wall which, with a tubular base portion connected thereto, is secured in the body of a valve. The tubular nipple portion terminates in a surface transverse to the axis of the cup thereby providing a free end adapted to cooperate sealingly with a valve seat.

When a seat cup of the prior art design is operatively carried in the seal chamber of a valve, the base portion is held against substantial axial and lateral displacement relative to the valve body. The nipple portion extends from the base portion toward the valve seat with suitable means being employed to mount the nipple removably to the inner end of a reciprocable valve stem. Upon axial movement of the stem away from the seat, the nipple portion is partially retracted and, due to the flexure at the transverse shoulder portion, the nipple telescopes within the base portion. Such retraction results in breaking the seal at the valve seat thereby permitting flow through the valve.

Since the opening and closing movements of a valve incorporating a seat cup of the type hereinabove described frequently occur, one particular problem has been of concern to the manufacturers. This has been the possibility of failure of the transverse shoulder due to the constant flexure imposed thereon. Within the range of commercial practicality, it generally is not feasible to design a seat cup which has an expected life equal to the useful life of the remaining components in the valve. Accordingly, it is not unusual that the seat cup will be replaced after a certain period of time. In view of this fact and the subsidiary fact that carbonated beverage dispensers are ordinarily operated under a relatively high pressure, with 40–50 p.s.i. being normal pressures and pressures exceeding that being not uncommon, it is important that the valve have sealing means in addition to the seat cup so that in the event of rupture of the cup, the beverage will not be disbursed, under pressure, about the immediate vicinity.

Accordingly, it is an object of this invention to provide an improved valve having a seat cup.

A further object of this invention is to provide sealing means in a valve which will prevent the uncontrolled dispensation of the beverage in the event of rupture of the transverse shoulder or wall in the seat cup.

A more specific object of this invention is to provide in a valve having a seat cup therein a duality of seals which prevents the leakage of any beverage.

Still a more specific object of the invention is to provide a seat cup having a nipple portion and a transverse radial wall or shoulder with a depending peripheral rib formed on the transverse shoulder, with the rib being adapted to be received in sealing engagement with a groove in the body of the housing.

It is still another object of this invention to provide a novel sealing means for the reciprocating stem in a valve whereby, in the event of rupture of the seat cup, fluid is prevented from leaking from the valve along the reciprocating stem.

These objects and features, as well as others which will become more apparent upon a complete reading of the following description, are accomplished by a valve which includes a body having a passageway therethrough and inlet and outlet ports in communication therewith; a seal chamber intermediate the ends of the passageway; a sealing seat defined by the seal chamber transverse the axis of the passageway; a stem in the seal chamber having one end opposed to the sealing seat in generally aligned relationship therewith; resilient sealing means disposed in the seal chamber received over said one end portion of the stem; an elongated tubular nipple portion included as a part of the sealing means and being coaxial with the stem; a transversely extending shoulder portion secured to the nipple portion; said transversely extending shoulder portion including a rib depending from and extending around the periphery thereof and being coaxial with the nipple portion; a groove formed in a transversely extending shoulder in the seal chamber with the rib being received in the groove; a spring encircling the valve stem; a spring cover received over the stem and having an aperture therein through which the stem passes; the spring cover including a depending peripheral flange which engages the transverse shoulder on the seat cup and which is in alignment with the peripheral rib thereon; a bonnet threadedly carried by said valve body and abutting the spring cover whereby, as the bonnet is threaded on the body, a longitudinal movement is imparted to the spring cover which compresses the spring and which forces the rib into the groove; and cooperating means formed in the lower surface of the bonnet and the upper surface of the spring cover and enclosing an O-ring encircling the stem thereby providing a sealing relationship between the stem and the bonnet.

To the accomplishment of the foregoing and related ends, the following description sets forth in detail one approved means of carrying out the invention. Such disclosed means are not meant to be limiting inasmuch as it constitutes but one of the various ways in which the principles of the invention may be applied.

In the drawings wherein like reference numerals indicate like parts in the various views.

Figure 1:
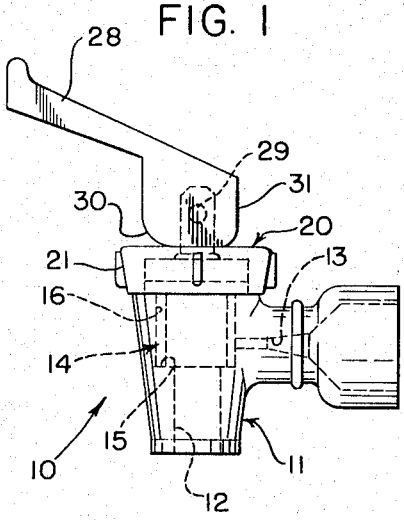
FIG. 1 is a side elevation view showing the valve combination.
Figure 2:
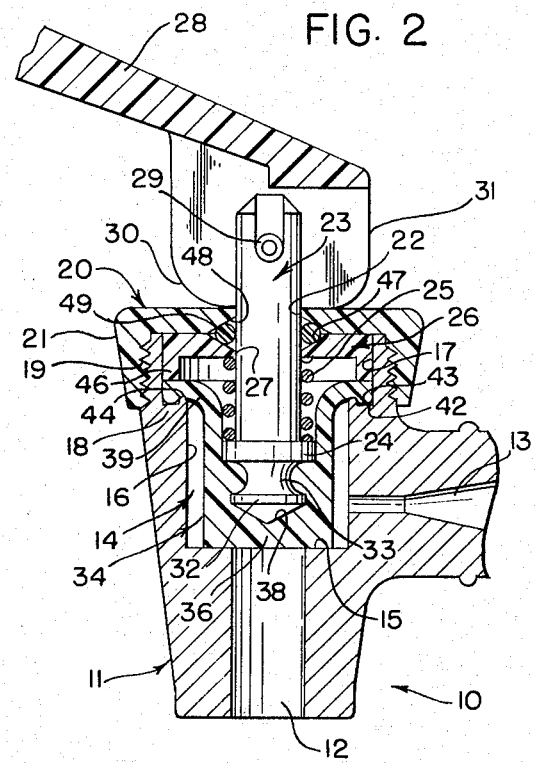
FIG. 2 is a side elevation view in section showing the valve in the closed position.
Figure 3:
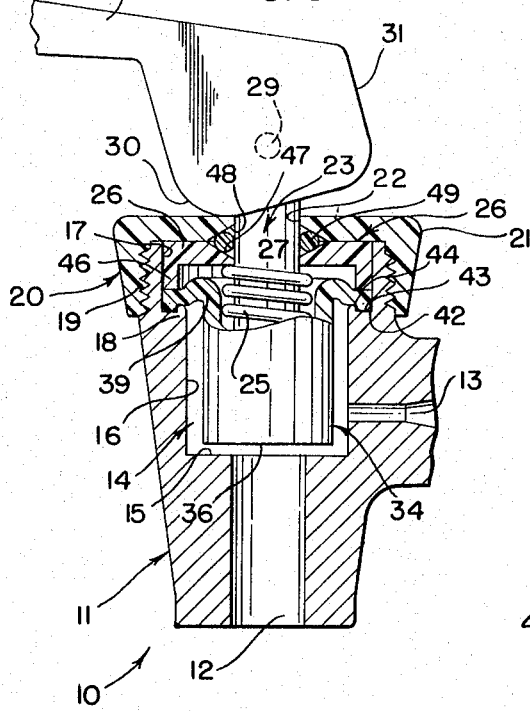
FIG. 3 is a view similar to FIG. 2 showing the valve in open position.
Figure 4:
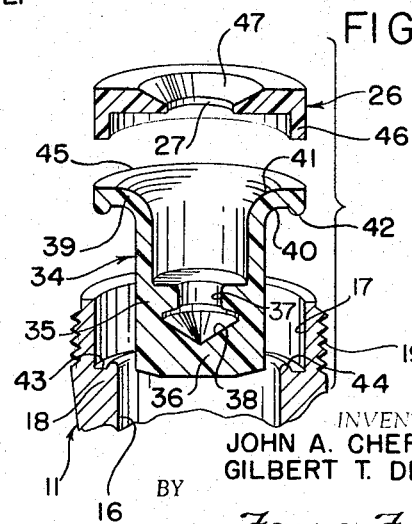
FIG. 4 is a partial perspective in section showing the seat cup and the compressing means.

Referring now to FIG. 1, a valve assembly is illustrated, indicated generally at 10. The valve assembly 10 comprises a body 11 having an outlet port 12 and an inlet port 13. A fluid passageway, indicated generally at 14, is provided in the valve body 11, the former being in communication with outlet and inlet ports 12 and 13 respectively.

The passageway 14 comprises a seat 15 which is oriented transversely of the axis of the oulet 12. Approximately coaxial with the outlet 12 and joining the seat 15 is a substantially cylindrical portion 16. A counterbore portion 17 is coaxial with the cylindrical portion 16 with a transversely extending shoulder 18 formed at the juncture of the counterbore 17 and the cylindrical portion 16. The portions 16 and 17 cooperate collectively to form a seal receiving chamber, with the inlet passage 13 opening therein.

The body 11 is threaded on its outer periphery at its upper extremity 19 to receive a cap assembly 20. The cap assembly comprises a bonnet 21 having a central opening or aperture 22, with the opening 22 being adapted to receive slidably a stem means, indicated generally at 23. The stem 23 has a collar 24 which provides an abutment for one end of a compression spring 25. The opposite end of the spring 25 abuts a spring cover 26 which is slidably received in the counterbored portion 17 of the body 11. The stem means 23 passes through an aperture 27 in the spring cover. It is believed apparent that the spring being interposed between the spring cover 26 and the collar 24 normally urges the stem toward the valve seat 15. A handle 28 is attached to the stem means 23 by appropriate pivot pin means indicated at 29. The handle has an arcuate cam portion 30 and a flat 31 whereby the stem 23 may be reciprocated in a manner believed to be readily understood. The stem means 23 has a knob 32 at its lower end which is joined to the stem by a reduced cylindrical portion 33.

Received in the seal chamber defined by the cylindrical portion 16 and the counterbore 17 is a seat cup component, indicated generally by the reference numeral 34. The seat cup comprises a tubular nipple portion 35 with a transverse end wall 36 closing the free end of the nipple. The end wall 36, when the seat cup is received in the valve body, is adapted to engage the sealing seat 15. Provided in the end wall 36 of the nipple portion 35 is a bore 37 formed generally along the longitudinal axis of the seat cup with the inner end of the bore provided with an enlargement 38 which is similar in configuration to the knob 32 on the end of the stem means 23. The knob 32 on the stem means 23 is removably snap fitted into the enlargement 38 thereby providing for effortless replacement of the seat cup when desired without the necessity of replacing the stem assembly as well.

The seat cup 34 further includes a transverse flange, shoulder or wall 39 which extends radially of the nipple portion 35. The flange 39 is connected to the nipple portion by an exterior large radius fillet 40 and an interior radius 41. Extending around the perriphery of the flange 39 is a depending rib 42. The rib 42 is coaxial with the nipple 35 and radially spaced therefrom. The dimension of the flange 39 is such that it is snugly received in the counterbore 17 in the body 11, with the rib 42 being received in a groove 43 formed in the transverse shoulder 18. The groove includes a lip 44 which interlocks with the rib 42 to assure the location and orientation of the rib in the housing and to prevent radial collapse of the peripheral edge of the transverse flange 39.

The seat cup 34 is constructed from any material which is compatible with carbonated beverages, such as neoprene rubber. The Shore "A" hardness of the material from which the seat cup is constructed should be within the range of 45–60 points, with a hardness of 50 points being preferred.

Adapted to abut the upper surface 45 on the flange 39 is a depending peripheral flange 46 on the spring cover 26. The flange 46 is radially spaced at an equal distance from the central axis of the valve body as is the rib 42 on the radial flange 39. With this arrangement, it is believed apparent that the flange 46 is in substantial, longitudinal and coaxial alignment with the rib 42 so that a compressive force may be exerted on the rib thereby to maintain the rib in the groove 43 on the body 11. As pointed out previously, this compressive force occurs due to the abutment of the spring cover against the bonnet 21 so that as the bonnet is threaded on the body, a longitudinal force is directed against the rib 42.

The aperture 27 through the spring cover 26 includes a chamfered portion 47 which defines an O-ring receiving recess. A similarly chamfered recess 48 on the bonnet cooperates to enclose an O-ring 49 which surrounds the stem means 23. The spring 25 biases the spring cover 26 to a position compressing the O-ring 49 thereby forcing the O-ring into sealing engagement with the stem 23.

With the valve in assembled condition, it is to be noted that the ribbed flange 39 is in sealing engagement with the groove 43 in the shoulder 18 in the valve body. In addition, there is a seal formed by the O-ring carried in the recesses 47, 48 surrounding the stem means 23. Thus, the only two areas in which leakage is possible in the seal chamber defined by the portions 16 and 17 have been effectively sealed by the structure hereinabove described. Therefore, in the event that rupture of the transverse shoulder should occur due to fatigue in the material, any fluid entering through the inlet port 13 would be contained within the valve body. This is particularly important under the conditions above set forth wherein pressures in the order of 40–50 p.s.i. are the normal operating pressures. Absent the sealing arrangement described, it will be readily understood that rupture of the seat cup would permit the spraying of the beverage around the stem 23 or through the threaded joint 19.

Although actual dimensions are not generally critical in the device described above, it is important that the parts be so dimensioned and interrelated that the transverse end wall 36 of the nipple 35 be forced against the seat 15 as the depending flange 46 abuts and compresses the rib 42 into the groove 43. With this arrangement, the threading of the bonnet on the body assures that the seating of the transverse wall 36 on the sealing seat 15 will occur without excessive deformation of the transverse shoulder 39 or, that the seating of the wall on the seat 15 will not prevent adequate compression of the rib 42. The formation of a seal at seat 15 and shoulder 18 should occur nearly simultaneously and at the same time as full thread engagement of the bonnet occurs. This relationship insures the proper lift of the end wall 36 when the handle 28 is operated.

It is believed apparent that the above-described valve fully satisfies each of the objects set forth above. Additional modifications and changes will suggest themselves to those having ordinary skill in the art. Changes such as these are contemplated by the principles of this invention so that although for ease of description, the principles of the invention have been set forth in connection with but one illustrated embodiment, it is not intended that these illustrated embodiments or the terminology employed in describing them is to be limiting; but rather, it is our desire to be restricted only by the scope of the appended claims.

We claim:
1. A valve for controlling fluid flow comprising;
a valve body having inlet and outlet ports;
a passageway in the valve body interconnecting said ports;
said passageway including a bore defining a seal chamber and a counterbore coaxial with said chamber;
a radial shoulder formed at the juncture of the sealed chamber and the counterbore in said body;
a sealing seat defined by the seal chamber transverse the axis of the passageway;
said shoulder including a groove formed therein concentric with said passageway and which defines a lip coaxial with said passageway extending away from said sealing seat;
a stem in the seal chamber having one end opposed to the sealing seat in generally aligned relationship therewith;
resilient sealing means disposed in the seal chamber and received over said one end portion of said stem;

said resilient sealing means including a longitudinally extending nipple portion having a transverse end wall adapted to engage said seat and a transverse radial flange adapted to engage said shoulder;

annular compressing means having a diameter substantially equal to the diameter of said flange disposed in said passageway surrounding said stem means and having a portion thereof extending towards said shoulder in said body to clamp said flange therebetween;

said flange, when clamped by said compressing means, having a portion thereof in said groove with the dimension of said portion of said compressing means in contact with said flange being substantially equal to the width of said groove;

spring means interposed between said one end of said stem and said compressing means biasing said stem toward said seat;

a bonnet rotatably received over said stem and threaded on the exterior of said valve body with said bonnet abutting said compressing means and thereby exerting a clamping force against said flange; and means to reciprocate said stem against the bias of said spring means.

2. The valve of claim 1 wherein said portion of said flange in said groove includes a depending peripheral rib extending toward said sealing seat;

the combined height of said ribbed portion of said flange and said portion of said compressing means being greater than the depth of said counterbore.

3. The valve of claim 2 and including an annular sealing means surrounding said stem;

said annular sealing means being retained between the abutting surfaces of said bonnet and said compressing means.

4. A valve for controlling fluid flow comprising:
a valve body having inlet and outlet ports;
a passageway in the valve body interconnecting said ports;
said passageway including a bore defining a seal chamber and a counterbore coaxial with said chamber;
a radial shoulder formed at the juncture of the seal chamber and the counterbore in said body;
a sealing seat defined by the seal chamber transverse the axis of the pasageway;

a stem in the seal chamber having one end opposed to the sealing seat in generally aligned relationship therewith;

resilient sealing means disposed in the seal chamber and received over said one end portion of said stem;

said resilient sealing means including a longitudinally extending nipple portion having a transverse end wall adapted to engage said seat and a transverse radial flange adapted to engage said shoulder;

annular compressing means in said passageway surrounding said stem means and having a portion thereof extending toward said shoulder in said body to clamp said flange therebetween;

spring means interposed between said one end of said stem and said compressing means biasing said stem toward said seat;

a bonnet received over said stem and threaded on said valve body with said bonnet abutting said compressing means and thereby exerting a clamping force against said flange;

means to reciprocate said stem against the bias of said spring means;

annular sealing means surrounding said stem; and cooperating recesses in the abutting surfaces of said bonnet and said compresing means enclosing said annular sealing means.

5. The valve of claim 4 wherein said cooperating recesses are defined by a bevel placed in the adjacent lips of the apertures extending through said bonnet and said compressing means.

References Cited by the Examiner

UNITED STATES PATENTS

| | | | |
|---|---|---|---|
| 2,089,977 | 8/1937 | Marchant | 251—331 X |
| 2,216,292 | 10/1940 | Evleth | 251—331 X |
| 2,603,445 | 7/1952 | Marchant | 251—331 X |
| 3,104,090 | 9/1963 | Callahan | 251—335 |

FOREIGN PATENTS

| | | |
|---|---|---|
| 104,112 | 5/1938 | Australia. |
| 648,678 | 1/1951 | Great Britain. |

M. CARY NELSON, *Primary Examiner.*

ARNOLD ROSENTHAL, *Assistant Examiner.*